United States Patent [19]

Toyoumi

[11] 4,304,633
[45] Dec. 8, 1981

[54] NUCLEAR POWER PLANT

[75] Inventor: Keiji Toyoumi, Hitachi, Japan

[73] Assignee: Hitachi, Ltd., Tokyo, Japan

[21] Appl. No.: 68,094

[22] Filed: Aug. 20, 1979

Related U.S. Application Data

[63] Continuation of Ser. No. 728,740, Oct. 1, 1976, abandoned.

[30] Foreign Application Priority Data

Oct. 24, 1975 [JP] Japan .................................. 50-127433

[51] Int. Cl.³ .............................................. G21C 9/00
[52] U.S. Cl. ......................................... 376/277; 415/9
[58] Field of Search .............. 176/38, 87; 60/39.09 R; 415/9, 121 G

[56] References Cited

U.S. PATENT DOCUMENTS

| | | | |
|---|---|---|---|
| 2,935,294 | 5/1960 | Angell et al. | 415/121 G |
| 3,050,282 | 8/1962 | Allen et al. | 415/9 |
| 3,203,180 | 8/1965 | Price | 415/9 |
| 3,261,228 | 7/1966 | Rothman | 415/9 |
| 3,602,602 | 8/1971 | Motta | 415/9 |
| 3,752,738 | 8/1973 | Naymark | 176/87 |
| 3,936,219 | 2/1976 | Holmes | 415/121 G |
| 4,199,300 | 4/1980 | Tubs | 415/9 |

FOREIGN PATENT DOCUMENTS

| | | | |
|---|---|---|---|
| 655897 | 1/1963 | Canada | 60/39.09 R |
| 2844137 | 4/1979 | Fed. Rep. of Germany | 415/9 |
| 868197 | 5/1961 | United Kingdom | 60/39.09 R |

OTHER PUBLICATIONS

Westinghouse Eng., Nuclear Propulsion Plant of USS Nautilus, p. 74–79, 3/55.
Nuc. Eng. International 8/75 Bildis Wall Chart, relevant portions.
Nuc. Eng. Int. 10/71 Sequoyah Wall Chart, relevant portions.
Nuc. Eng. Int. 7/71 Phenix Wall Chart, relevant portions.

*Primary Examiner*—S. A. Cangialosi
*Attorney, Agent, or Firm*—Thomas E. Beall, Jr.

[57] ABSTRACT

A nuclear power plant comprising a control building for receiving therein control instruments which make controls of the nuclear energy plant, a reactor building for receiving a nuclear reactor therein, a turbine building for receiving therein turbines and a generator which are driven by steam supplied from the nuclear reactor, said buildings being arrayed in a straight line, and scattering fragments-checking means disposed on the inner wall of a turbine casing, said means functioning so that when a turbine rotary body breaks and scatters, the scattering fragments may collide against it and have their rescattering directions limited.

17 Claims, 9 Drawing Figures

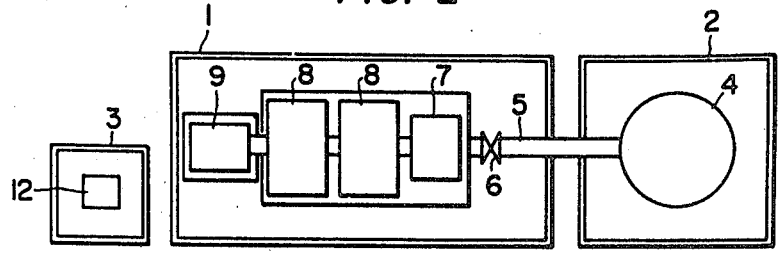
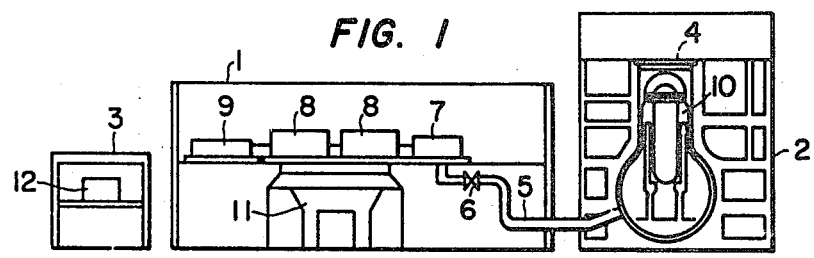
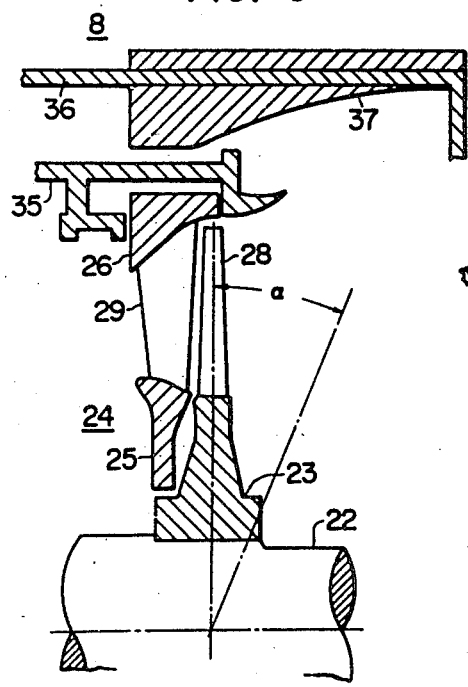
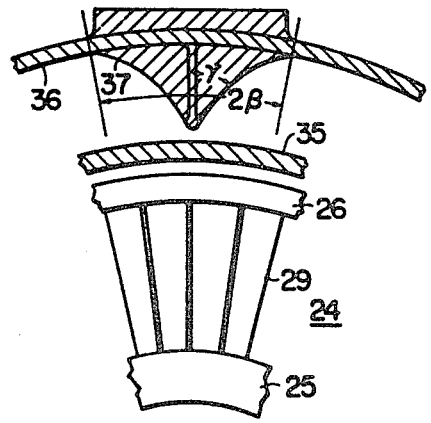

४,३०४,६३३

NUCLEAR POWER PLANT

This is a continuation, of application Ser. No. 728,740, filed Oct. 1, 1976, now abandoned.

BACKGROUND OF THE INVENTION

This invention relates to the arrangement of a nuclear power plant and the turbine structure thereof.

In the nuclear power plant, there is a very low possibility that a turbine portion which is a constituent equipment of the plant will be broken by any cause (a probability to the extent that the breakdown will occur once in a million years for 1 unit of turbine). It is therefore the actual circumstances that the safety of a nuclear reactor concerning the breakdown of a turbine has not heretofore been considered.

For example, the T-shaped arrangement of buildings is extensively adopted in conventional nuclear power plants. That is, the reactor building and the control building are arranged at positions orthogonal to the turbine building which is equipped with a high pressure turbine, a low pressure turbine and a generator. If, in the nuclear power plant of such arrangement, the breakdown of the turbine should occur by any cause, scattering objects of the turbine will collide against the reactor building and the control building and will damage the nuclear reactor and control instruments received therein. This is feared to lead to a serious accident. That is, when the reactor building and the control building are arranged so as to form the T shape with the turbine building, they are situated in parallel with the direction of rotation of a turbine rotary body, and there is a very high possibility that they will be exposed to the scattered turbine objects in case of the breakdown of the turbine.

SUMMARY OF THE INVENTION

It is an object of this invention to provide a nuclear power plant in which, even when the breakdown of a turbine occurs by any chance, scattering fragments of the turbine are prevented from colliding against a reactor building or a control building.

Another object of this invention is to provide a nuclear power plant in which, in case of the breakdown of a turbine, scattering fragments of the turbine have their rescattering directions regulated and are prevented from rescattering towards a reactor building or a control building adjacent to a turbine building.

This invention consists in regulating the rescattering directions of scattering fragments of a turbine when the turbine breaks down by any change, thereby to prevent a reactor building and a control building from being exposed to the turbine fragments and to prevent a serious accident such as the damage of a nuclear reactor from occurring. It is characterized in that a reactor building for receiving a nuclear reactor therein and a control building for receiving therein control instruments which make controls of a plant are arranged so as to constitute a straight arrayal together with a turbine building for receiving turbines therein, and that scattering fragments-checking means for letting scattering fragments of the turbine collide against it so as to regulate the rescattering directions thereof is disposed on a turbine casing.

BRIEF DESCRIPTION OF THE DRAWING

FIG. 1 is a schematic arrangement plan showing the arrangement of buildings of a nuclear power plant to which this invention is applied, FIG. 2 is a top view of the arrangement in FIG. 1, FIG. 3 illustrates an embodiment of the nuclear power plant according to this invention, and is a partly sectional view of a low pressure turbine showing the state in which a scattered fragments-reflecting plate is disposed in a turbine portion, FIG. 4 is a partly sectional view with the embodiment of FIG. 3 seen in the direction of the turbine axis.

DESCRIPTION OF THE PREFERRED EMBODIMENTS

Figure 5:
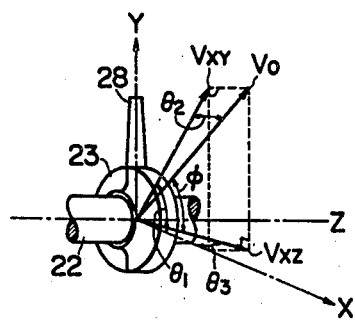
FIG. 5 is an explanatory view showing a velocity spectrum and projection angles in the case where a disc at the final stage of a turbine breaks and becomes scattering fragments.

A nuclear power plant to which this invention is applied will be described with reference to the drawing. As shown in FIGS. 1 and 2, the nuclear power plant consists of a turbine building 1, a reactor building 2 and a control building 3. The reactor building 2 receives a nuclear reactor 10 and a reactor shield plug 4 therein. The turbine building 1 receives therein a high pressure turbine 7 and low pressure turbines 8 into which steam supplied from the reactor 10 is introduced through a main steam pipe 5 having a steam valve 6, a generator 9 which is driven by the turbines 7 and 8 and which is loaded, and a condenser 11 which cools and condenses the steam having passed through the low pressure turbines 8. The control building 3 receives therein control instruments 12 which make the controls of various equipments of the nuclear energy plant.

The turbine building 1, the reactor building 2 and the control building 3 are arranged in a straight arrayal unlike the T-shaped arrayal of the prior art.

Owing to such straight arrangement of the buildings constituting the nuclear energy plant, even if the turbine portion should break down by any cause, there is the least possibility that the reactor building 2 and the control building 3 arranged along the direction of the turbine axis in which scattering fragments of the turbine are the most difficult to arrive since the turbine is a rotary body will be exposed to the scattering turbine fragments. Accordingly, there can be lessened the danger that the breakdown of the turbine portion will lead to a serious accident such as the damage of the reactor and the damage of the control instruments.

Description will now be made of an embodiment in which means to regulate the rescattering direction of the scattering fragment is further disposed in the turbine portion. Referring to FIGS. 3 and 4, a turbine rotary body consists of a turbine rotor 22, a circular plate-like turbine disc 23 which is installed on the outer periphery of the rotor, and a large number of moving vanes 28 which are annularly arrayed on the outer periphery of the disc. Between the adjacent stages of the turbine rotary bodies, there is disposed a turbine diaphragm 24 which consists of an inner ring 25 and an outer ring 26 with stationary vanes 29 annularly arrayed therebetween. An inner turbine casing 35 is provided around the turbine rotary bodies and the turbine diaphragms 24. Further, an outer turbine casing 36 is provided around the inner turbine casing 35. A scattering fragments-reflecting plate 37 is installed on an inner wall inside the top part of the outer turbine casing 36. That is, the position of installation of the scattering fragments-reflecting plate 37 is the outer turbine casing part in the vicinity of the final turbine stage at which only one turbine casing exists and in case of the breakdown of the turbine rotary body, therefore, the prevention of the scattering is difficult. With reference to the moving vanes 28 and the turbine rotor 22 at the final turbine stage, the scattering fragments-reflecting plate 37 has an axial mounting angle (along the axis of the reflecting plate) $\alpha$ in the direction of the turbine rotor and a circumferential mounting angle (along the circumference of the outer turbine casing) $\beta$ in the direction orthogonal to the turbine rotor. The scattering fragments-reflecting plate 37 has a sectional shape of a triangle in which a central part is a vertex. The angle of the vertex as shown in FIG. 4 is represented as a tip angle $\gamma$ of the reflecting plate. Both side surfaces which hold the vertex therebetween are formed so as to have a curvature.

Where the turbine disc 23 splits into a ⅓-size and scatters, the scattering energy is the greatest. In order to overcome the scattering turbine disc, therefore, it is desirable to make the weight of the scattering fragments-reflecting plate 37 heavier than ⅓ of the weight of the turbine disc.

It is desirable that the angles $\alpha$ and $\beta$ are above 5°, respectively. Further, it is desirable to make the reflector plate tip angle $\gamma$ below 30°. It has been experimentally shown that the scattering turbine fragments colliding against the reflector plate 37 are thus reflected by said plate 37 without fail. Even if the scattering turbine bodies fly out to the exterior by any chance, the projectile angle $\phi$ does not become above 85° since the scattering fragments that would otherwise have had a projectile angle $\phi$ above 85° have collided against the reflector plate 37 once and have had their rescattering directions limited.

Figure 8:
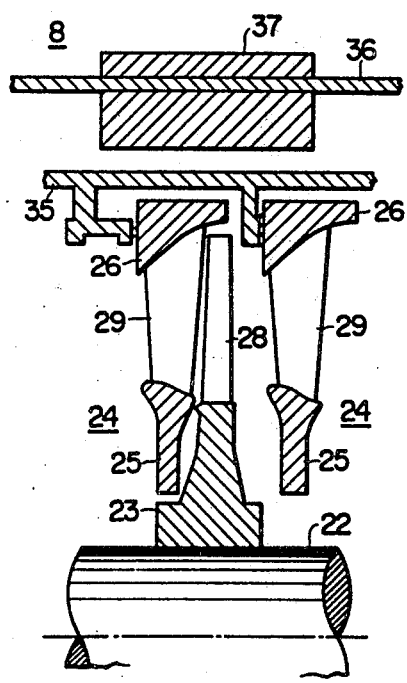
FIG. 8 illustrates another embodiment of the nuclear power plant according to this invention, and is a partly sectional view of a low pressure turbine showing the state in which a scattered fragments-reflecting plate for a preceding stage disc at the final stage of a turbine is disposed on an outer casing of the turbine.
Figure 9:
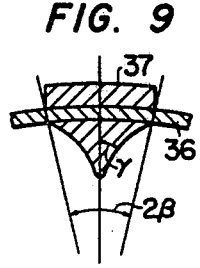
FIG. 9 is a partly sectional view with the embodiment of FIG. 8 seen in the direction of the turbine axis.

FIGS. 8 and 9 show another embodiment in which, according to this invention, the scattering fragments-reflecting plate 37 for the disc 23 at a stage other than the final turbine stage is additionally provided on the outer casing 36. Various parts in these figures are designated by symbols corresponding to those in FIGS. 3 and 4.

Figure 6:
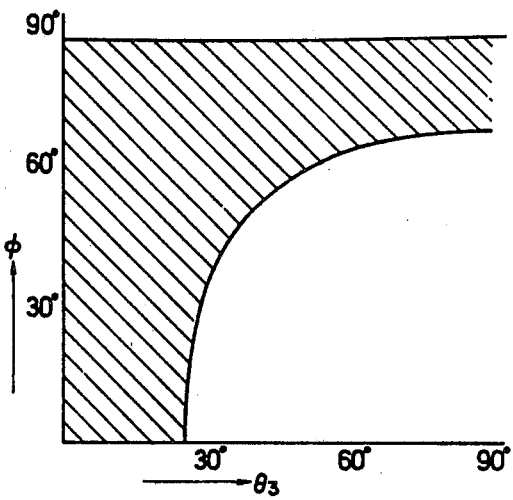
FIG. 6 is an explanatory view showing a hatched region of values which the projectile or rescattering angle $\phi$ of the scattering fragment can assume versus the changes of the projection angle of the scattering fragment projected on a horizontal plane in FIG. 5.
Figure 7:
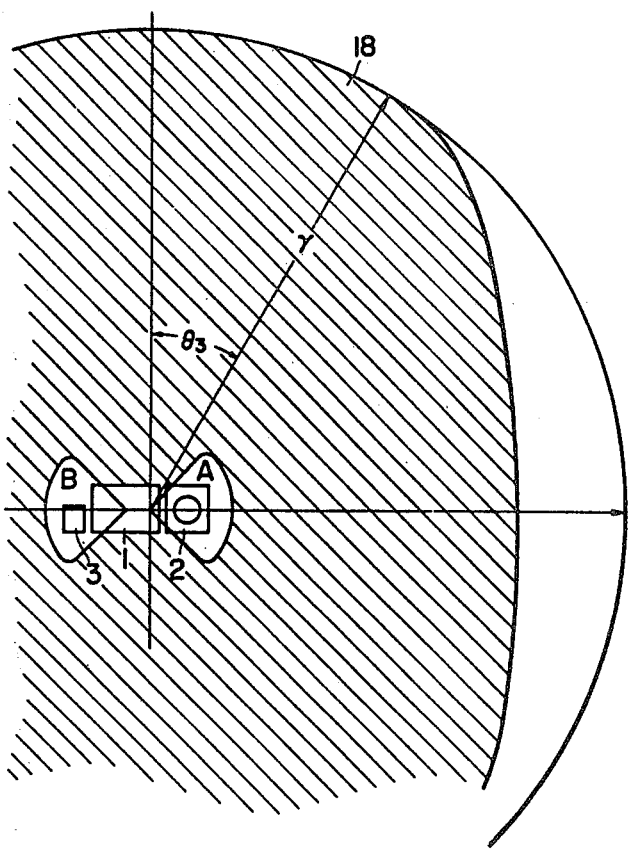
FIG. 7 is an explanatory view showing by hatching the changes of a rescattering region of the scattering fragment versus the changes of the projection angle $\theta_3$ of the scattering fragment on the horizontal plane.

Referring now to FIGS. 5, 6 and 7, description will be made of the scattering direction of the scattering turbine fragment in the case of the breakdown of the turbine and a region at which the scattering fragment does not arrive owing to the scattering fragments-reflecting plate 37.

In FIG. 5, the turbine rotary body is composed of the turbine rotor 22, the turbine disc 23 and the moving vane 28. Let's consider a coordinate system including a Z axis which passes through the turbine axis, and an X axis in the horizontal direction and a Y axis in the vertical direction which respectively intersect orthogonally to the Z axis. If the scattering velocity of the scattering turbine body is $V_o$, the scattering velocity of $V_o$ as projected on the X-Y plane is $V_{xy}$, and the scattering velocity of $V_o$ as projected on the X-Z plane is $V_{xz}$. Projection angles $\theta_1$, $\theta_2$ and $\theta_3$ at that time are defined as follows:

$\theta_1$: angle of $V_{xy}$ from the X axis, $V_{xy}$ being obtained by projecting $V_o$ on the X-Y plane, $\theta_2$: angle from $V_{xy}$ on the X-Y plane to $V_o$, and $\theta_3$: angle of $V_{xz}$ from the X axis, $V_{xz}$ being obtained by projecting $V_o$ on the X-Z plane.

Further, the projectile angle $\phi$ of the scattering body is provided to indicate an angle from $V_{xz}$ on the X-Z plane to $V_o$.

Let's consider a case where the final stage disc 23 becomes the scattering object by any chance. Then, as shown in FIG. 5, the scattering object tries to fly out to the exterior at the initial velocity $V_o$. Among the angles $\theta_1$, $\theta_2$, $\theta_3$ and $\phi$ indicated in the figure, the following relations hold:

$$\cot \theta_3 = \cot \theta_2 \cdot \cos \theta_1$$

$$\sin \phi = \sin \theta_1 \cdot \cos \theta_2$$

Here, it has been experimentally known that the angles $\theta_1$ and $\theta_2$ are in ranges of $0° < \theta_1 < 90°$ and $0° < \theta_2 < 25°$. It has been experimentally determined that the angles shown in FIG. 4 is added to the upper part of the low-pressure outer casing 36 so that $\phi$ may not assume an angle above 85°. At $\phi > 85°$, the scattering turbine fragment collides against the scattering fragments-reflecting plate 37 and is checked from leaving the outer casing at an angle $\phi$ greater than 85° by rescattering. In consequence, the region of values which the projectile angle $\phi$ of the scattering fragment can assume versus the changes of $\theta_3$ is indicated by a hatching portion in FIG. 6. The scattering region of the scattering fragment is given by the following equation:

$$r = (V_o^2 / 9.8 \times \sin 2\phi)$$

The result of the calculation is as shown in FIG. 7. Regions A and B at which no scattering fragment arrives appear in the vicinities of the extended line of the turbine building 1. The reactor building 2 and the control building 3 are arranged in the regions A and B. In FIG. 7, numeral 18 designates the region at which the scattering fragments arrive, symbol $\theta_3$ the projection angle of the scattering fragment on the horizontal plane, and letter r the scattering distance of the scattering fragment.

In this manner, where the final stage disc 23 becomes the scattering fragment by any chance, the scattering body is regulated by the scattering bodies-reflecting plate 37 mounted on the outer casing 36, and its projectile angle $\phi$ cannot assume any angle greater than the fixed angle as determined by the scattering bodies-reflecting plate 37. It is accordingly secured that the scattering fragment never collides against the regions A and B which lie in line with the turbine building. When the reactor building and the control building are arranged in the regions A and B, the collision of the scattering fragment can be perfectly prevented. By mounting the similar reflector plate 37 on the casing 36 above the disc of the turbine disc stage other than the final stage, a higher safety can be achieved.

As set forth above, owing to the scattering fragments-reflecting plate of this invention, there arise the regions at which the scattering fragment does not arrive even if the turbine portion should scatter. In order to arrange the reactor building and the control building in these regions, the buildings need be arranged straight as illustrated in FIG. 2. Although, in the nuclear power plant in FIGS. 1 and 2, the reactor building and the control building are separately arranged on both the sides of the turbine building, both the buildings may be arranged straight on one side of the turbine building. As an advantage in the former case, the control building has the effect of shield in case of an accident in the reactor building. As an additional advantage of the straight arrangement of the respective buildings of the nuclear power plant, there can be mentioned the fact that the steam pipe shortens.

I claim:

1. A nuclear power plant, comprising: a nuclear reactor; control means for controlling the functions of said nuclear reactor; means for generating steam from the heat generated by said nuclear reactor; turbine means for being driven by the steam generated by said nuclear reactor; and said turbine means comprising a rotor having a mounting disk carrying a plurality of blades and being mounted for rotation about a generally fixed axis, a turbine casing surrounding said rotor and being stationarily mounted, and deflection plate means mounted only on a minor segment of said casing within the trajectory that any broken blade and disk portions would travel by centrifugal force from said rotor to said nuclear reactor for deflecting said broken blade and disk portions traveling by centrifugal force toward said nuclear reactor through an obtuse angle to other trajectories away from said nuclear reactor; and as seen in a plane perpendicular to said axis, the surface of said plate means that faces inwardly towards said blades being substantially entirely formed throughout its extent so that tangents thereto form outwardly opening acute angles with respect to corresponding intersecting radii so as to deflect any broken particles traveling along trajectories that would otherwise lead them to said nuclear reactor.

2. The nuclear power plant according to claim 1, including a control building for receiving therein said control means, a separate reactor building for receiving therein said nuclear reactor, a separate turbine building for receiving therein said turbine means, said buildings being aligned with said turbine rotor axis, and said deflection plate means being on an inner wall side of a top part of said turbine casing.

3. The nuclear power plant according to claim 2, wherein said deflection plate means is formed into a sectional shape of a triangle which has a vertex at a central part pointing radially inward toward said axis and whose surfaces on both sides of said vertex are curved concavely inwardly.

4. The nuclear power plant according to claim 3, wherein said plate means inwardly facing surface is peaked inwardly and generally symmetrical with respect to an axial vertical plane as seen in cross sections transverse to the turbine axis and wherein the peripheral extent of said plate means relative to said axis defines a sector having an interior angle greater than 10°.

5. The nuclear power plant according to claim 4, wherein the inwardly facing surface of said plate means in cross section, as seen in an axial plane, increases in distance from said turbine axis starting from a point diametrically opposite said blades outwardly therefrom in the axial direction and wherein the angle from said diametrically opposite point to the axially farthest point of said plate means defines an angle, as measured from said axis, that is less than 30°.

6. The nuclear power plant according to claim 5, wherein the weight of said plate means is at least as great as the weight of one-third of said disk.

7. The nuclear power plant according to claim 2, wherein said deflection plate means is formed into a sectional shape of a triangle which has a vertex at a central part pointing radially inward to said axis.

8. The nuclear reactor according to claim 1, wherein said plate means completely blocks the trajectories that broken blade and disk portions take by centrifugal force from said rotor to said control means and said control means are generally aligned with said axis of said turbine means.

9. The nuclear power plant according to claim 8, wherein the inwardly facing surface of said plate means in cross section, as seen in an axial plane, increases in distance from said turbine axis starting from a point diametrically opposite said blades outwardly therefrom in the axial direction.

10. The nuclear power plant according to claim 9, wherein the angle from said diametrically opposite point to the axially farthest point of said plate means defines an angle, as measured from said axis, that is less than 30°.

11. The nuclear power plant according to claim 1, wherein said plate means inwardly facing surface is peaked inwardly and generally symmetrical with respect to an axial vertical plane as seen in cross sections transverse to the turbine axis.

12. The nuclear power plant according to claim 11, wherein the innermost portion of said peaked plate means surface generally forms an angle less than 30° with the axial plane of symmetry.

13. The nuclear power plant according to claim 12, wherein the peripheral extent of said plate means relative to said axis defines a sector having an interior angle greater than 10°.

14. The nuclear power plant according to claim 1, the inwardly facing surface of said plate means in cross section, as seen in an axial plane, increases in distance from said turbine axis starting from a point diametrically opposite said blades outwardly therefrom in the axial direction.

15. The nuclear power plant according to claim 14, wherein the angle from said diametrically opposite point to the axially farthest point of said plant means defines an angle, as measured from said axis, that is less than 30°.

16. The nuclear power plant according to claim 1, wherein the peripheral extent of said plate means relative to said axis defines a sector having an interior angle greater than 10°.

17. The nuclear power plant according to claim 1, wherein the weight of said plate means is at least as greater as the weight of one-third of said disk.

* * * * *